United States Patent
Paik et al.

(10) Patent No.: US 9,697,591 B2
(45) Date of Patent: Jul. 4, 2017

(54) NON-DYADIC LENS DISTORTION CORRECTION METHOD AND APPARATUS

(71) Applicant: Chung-Ang University Industry-Academy Cooperation Foundation, Seoul (KR)

(72) Inventors: Joon Ki Paik, Seoul (KR); Jin Ho Park, Seoul (KR); Dong Gyun Kim, Seoul (KR); Yoon Jong Yoo, Gyeonggi-do (KR); Dae Hee Kim, Incheon (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 0 days.

(21) Appl. No.: 15/056,053

(22) Filed: Feb. 29, 2016

(65) Prior Publication Data
US 2016/0180507 A1  Jun. 23, 2016

Related U.S. Application Data

(63) Continuation of application No. PCT/KR2015/006062, filed on Jun. 16, 2015.

(30) Foreign Application Priority Data

Sep. 24, 2014  (KR) .................. 10-2014-0127572

(51) Int. Cl.
*G06K 9/40* (2006.01)
*G06T 5/00* (2006.01)
(Continued)

(52) U.S. Cl.
CPC ............ *G06T 5/006* (2013.01); *G06T 3/0018* (2013.01); *G06T 5/003* (2013.01); *H04N 5/217* (2013.01);
(Continued)

(58) Field of Classification Search
CPC ....... G06T 5/006; G06T 5/003; H04N 5/23238; H04N 5/217
(Continued)

(56) References Cited

U.S. PATENT DOCUMENTS

2009/0122422 A1*  5/2009  Yoshida ................... G02B 9/34
                                                              359/717
2013/0287319 A1*  10/2013  Yamamoto ............ G06T 3/0087
                                                              382/293

FOREIGN PATENT DOCUMENTS

JP        2008-311890 A    12/2008
KR   10-2009-0071366 A    7/2009

OTHER PUBLICATIONS

Kang, M. et al., "The Compensation for blurred image using Example-based neural network training of high frequency component", Proceedings of KIIS Spring Conference, English Abstract (2009) vol. 19, No. 1, pp. 38-41.

* cited by examiner

*Primary Examiner* — Ruiping Li
(74) *Attorney, Agent, or Firm* — Mintz Levin Cohn Ferris Glovsky and Popeo, P.C.; Kongsik Kim; Jonathon Western (57) ABSTRACT

Provided are a non-dyadic lens distortion correction method and an apparatus thereof. The non-dyadic lens distortion correction method includes: (a) acquiring a non-dyadic lens image photographed through a non-dyadic lens; (b) correcting geometric distortion for the non-dyadic lens image by stage by applying a magnification ratio based on a projection model; and (c) compensating a high-frequency component of an image corrected in a previous step by the patch unit in the non-dyadic lens image of which the geometric distortion is corrected.

12 Claims, 10 Drawing Sheets

(51) Int. Cl.
    *H04N 5/217*     (2011.01)
    *H04N 5/232*     (2006.01)
    *G06T 3/00*     (2006.01)
    *H04N 5/357*     (2011.01)

(52) U.S. Cl.
    CPC ....... *H04N 5/23238* (2013.01); *H04N 5/3572* (2013.01)

(58) Field of Classification Search
    USPC .......................................................... 382/275
    See application file for complete search history.

NON-DYADIC LENS DISTORTION CORRECTION METHOD AND APPARATUS

CROSS-REFERENCE(S) TO RELATED APPLICATION

This application claims priority of Korean Patent Application No. 10-2014-0127527, filed on Sep. 24, 2014, which is hereby incorporated by reference in its entirety.

TECHNICAL FIELD

The present invention relates to a non-dyadic lens distortion correction method and an apparatus thereof which can restore a dyadic-lens image by correcting geometrical distortion of the non-dyadic lens image.

BACKGROUND ART

A non-dyadic lens having a wide field of view having an advantage of acquiring an image including a wider view than a general lens has been in various digital imaging devices including a monitoring system, medical imaging equipment, a vehicular rear camera, and the like. The image acquired through the non-dyadic lens has a disadvantage having significant radial distortion as being distant from the center of the image.

As the image acquired through the non-dyadic lens, a high-resolution image including a lot of information can be acquired at the center, while since non-linear resolution deterioration occurs on the periphery, an overall quality of the image deteriorates.

Various distortion correcting methods have been studied in order to solve such a distortion problem of the dyadic lens. Representatively, Brown describes the radial distortion by using an odd number-th polynomial expression and Tsai proposes an image correcting method in a 3D space by using the odd number-th polynomial expression. Further, Zhang proposes a method for correcting the image by using a plane pattern photographed in various distances and directions and Hughes proposes a method for correcting the image by extracting a vanishing point in the distorted image.

However, since the methods for correcting the distortion in the related art use a linear interpolation method, the methods have a problem in which an aliasing phenomenon increases in a radial direction as being distant from the center of the image.

SUMMARY

The present invention has been made in an effort to provide a non-dyadic lens distortion correction method and an apparatus thereof which can remove a step and a blurring phenomenon by geometric radial distortion which occurs during correcting a non-dyadic lens image.

An aspect of the present invention is directed to provide a non-dyadic lens distortion correction method which can remove a step and a blurring phenomenon by geometric radial distortion which occurs during correcting a non-dyadic lens image.

According to an exemplary embodiment of the present invention, a non-dyadic lens distortion correction method may be provided, which includes: (a) acquiring a non-dyadic lens image photographed through a non-dyadic lens; (b) correcting geometric distortion for the non-dyadic lens image by stage by applying a magnification ratio based on a projection model; and (c) compensating a high-frequency component of an image corrected in a previous step by the patch unit in the non-dyadic lens image of which the geometric distortion is corrected.

Steps (b) and (c) may be performed by stage according to the magnification ratio until the number of correction steps is more than the number of final correction steps.

Step (b) may include calculating a phased compensation point $p_i$ depending on the magnification ratio by multiplying a distortion function in the projection model by the magnification ratio; calculating a corresponding point $n_i$ corresponding to the phased compensation point $p_i$ on a straight line connecting a principal point and a point P in a 3D space based on the projection model; calculating a focus $F_i$ of a parabolic equation passing through an optical axis on an image plane and the corresponding point $n_i$; and correcting the geometric distortion of the non-dyadic lens image depending on the magnification ratio by using the focus $F_i$.

The focus $F_i$ may be calculated by an equation given below.

$$F_i = \frac{(R\sin(\theta) \times s^i)}{4\left(\frac{\cos(\theta)}{\sin(\theta)}(R\sin(\theta) \times s^i) - R\right)}$$

Herein, R represents a distance between the principal point and the image plane, s represents the magnification ratio, i represents the correction step, and $\theta$ represents an angle between the optical axis and the point P in the 3D space.

Step (c) may include performing dual-tree complex wavelet transform with respect to each of the corrected non-dyadic lens image and the image corrected in the previous step; transforming a low-frequency subband into a first value in a result of the wavelet transform and thereafter, extracting the high-frequency component by performing inverse transform; searching an example patch of the image corrected in the previous step, which is most similar to a patch of the corrected non-dyadic lens image; and compensating a high-frequency component of the searched example patch with the patch of the corrected non-dyadic lens image.

In the searching of the example patch of the image corrected in the previous step, which is most similar to the patch of the corrected non-dyadic lens image, the example patch may be searched by using the low-frequency subband of the wavelet transform result.

The searching of the example patch of the image corrected in the previous step, which is most similar to the patch of the corrected non-dyadic lens image may include calculating an optimal movement vector with a minimum value of the sum of absolute differences between the patch of the corrected non-dyadic lens image and the example patch of the image corrected in the previous; and selecting a final example patch by reflecting the movement vector to the example patch.

Another aspect of the present invention is directed to provide a non-dyadic lens distortion correction apparatus which can remove a step and a blurring phenomenon by geometric radial distortion which occurs during correcting a non-dyadic lens image.

According to an exemplary embodiment of the present invention, a non-dyadic lens distortion correction apparatus may be provided, which includes: an image acquiring unit acquiring a non-dyadic lens image photographed through a non-dyadic lens; a correction unit correcting geometric distortion for the non-dyadic lens image by stage by applying a magnification ratio based on a projection model; and a compensation unit compensating a high-frequency component of an image corrected in a previous step by the patch unit in the non-dyadic lens image of which the geometric distortion is corrected.

The correction unit and the compensation unit may repeatedly perform the correction and compensation processes until the number of correction steps is more than the number of final correction steps.

The correction unit may calculate a phased compensation point $p_i$ depending on the magnification ratio by multiplying a distortion function in a projection model by the magnification ratio, calculate a corresponding point $n_i$ corresponding to the phased compensation point pi on a straight line connecting a principal point and a point P in a 3D space based on the projection model, and calculate a focus $F_i$ of a parabolic equation passing through an optical axis on an image plane and the corresponding point $n_i$ and thereafter, correct the geometric distortion of the non-dyadic lens image depending on the magnification ratio by using the focus $F_i$.

The compensation unit may perform dual-tree complex wavelet transform with respect to each of the corrected non-dyadic lens image and the image corrected in the previous step, transform a low-frequency subband into a first value in a result of the wavelet transform and thereafter, extract each high-frequency component by performing inverse transform, and search an example patch of the image corrected in the previous step, which is most similar to the patch of the corrected non-dyadic lens image with the patch of the corrected non-dyadic lens image.

The compensation unit may search the similar example patch by using the low-frequency subband among the wavelet transform results for the corrected non-dyadic lens image and the image corrected in the previous step.

The compensation unit may calculate an optimal movement vector with a minimum value of the sum of absolute differences between the patch of the corrected non-dyadic lens image and the example patch of the image corrected in the previous; and select a final example patch most similar to the patch of the corrected non-dyadic lens image by reflecting the movement vector to the example patch.

According to exemplary embodiments of the present invention, a non-dyadic lens distortion correction method and an apparatus thereof can remove step and blurring phenomena by geometric radial distortion which occurs during correcting a non-dyadic lens image, thereby creating a high-quality image.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

The present invention may have various modifications and various embodiments and specific embodiments will be illustrated in the drawings and described in detail in the detailed description. However, this does not limit the present invention within specific exemplary embodiments, and it should be understood that the present invention covers all the modifications, equivalents and replacements within the idea and technical scope of the present invention. Further, in the following description, a detailed explanation of known related technologies may be omitted to avoid unnecessarily obscuring the subject matter of the present disclosure.

Terms such as first, second, and the like may be used to describe various components and the components should not be limited by the terms. The terms are used only to discriminate one constituent element from another constituent element.

Terms used in the present application are used only to describe specific exemplary embodiments, and are not intended to limit the present invention. Singular expressions used herein include plural expressions unless they have definitely opposite meanings in the context. In the present application, it should be understood that term "include" indicates that a feature, a number, a step, an operation, a component, a part or the combination thereof described in the specification is present, but does not exclude a possibility of presence or addition of one or more other features, numbers, steps, operations, components, parts or combinations, in advance.

Hereinafter, exemplary embodiments of the present invention will be described in detail with reference to the accompanying drawings.

Figure 1:
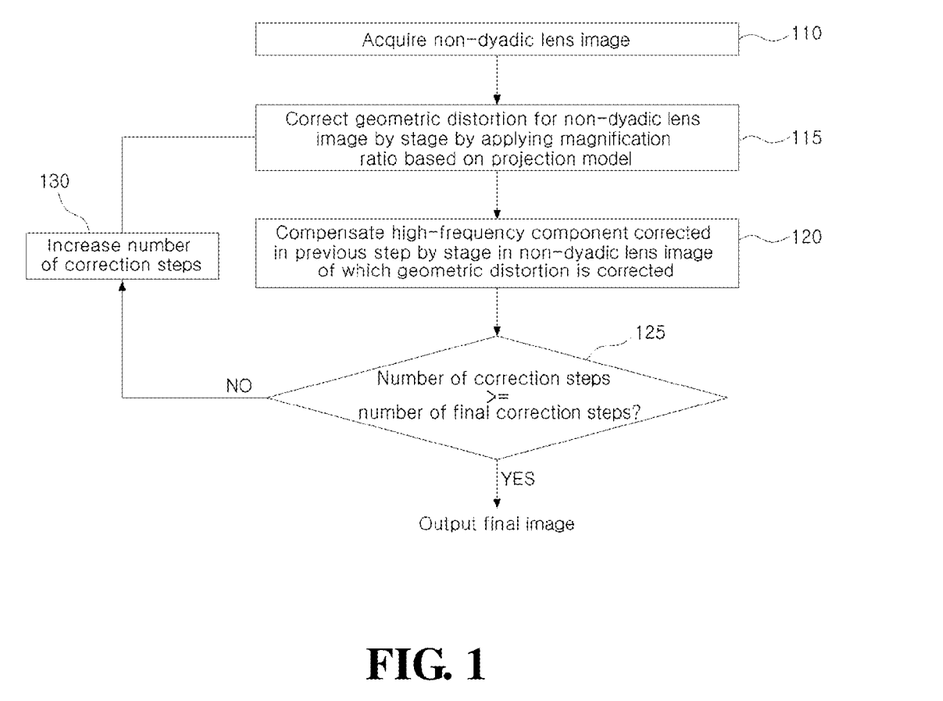
FIG. 1 is a flowchart of a non-dyadic lens distortion correction method according to an exemplary embodiment of the present invention.
Figure 2A:
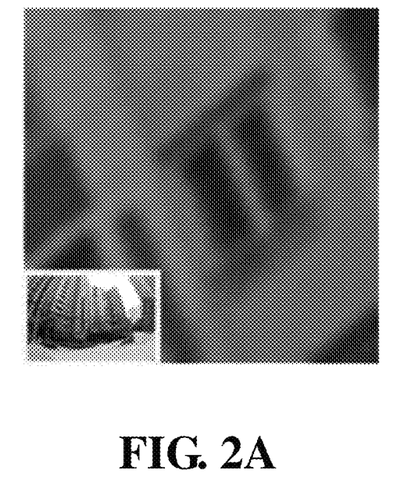
FIGS. 2A and 2B are diagrams illustrating a non-dyadic lens image distortion correcting result based on a projection image.
Figure 2B:
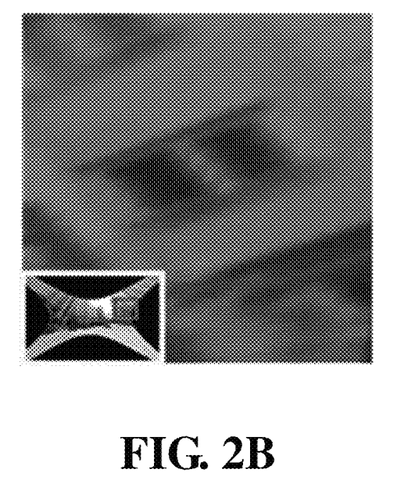
Figure 3:
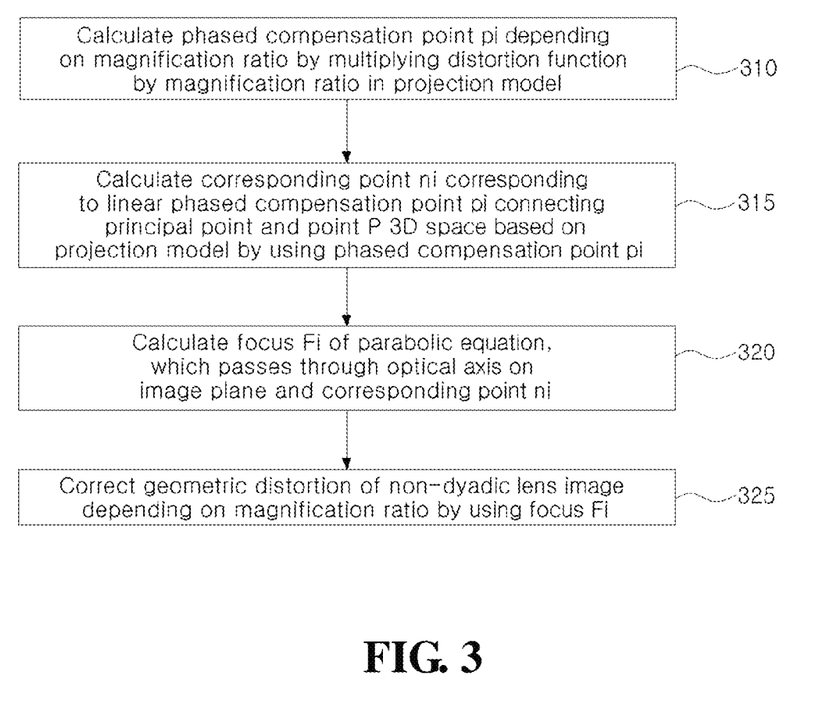
FIG. 3 is a flowchart of a phased non-dyadic lens distortion correction method according to an exemplary embodiment of the present invention.
Figure 4:
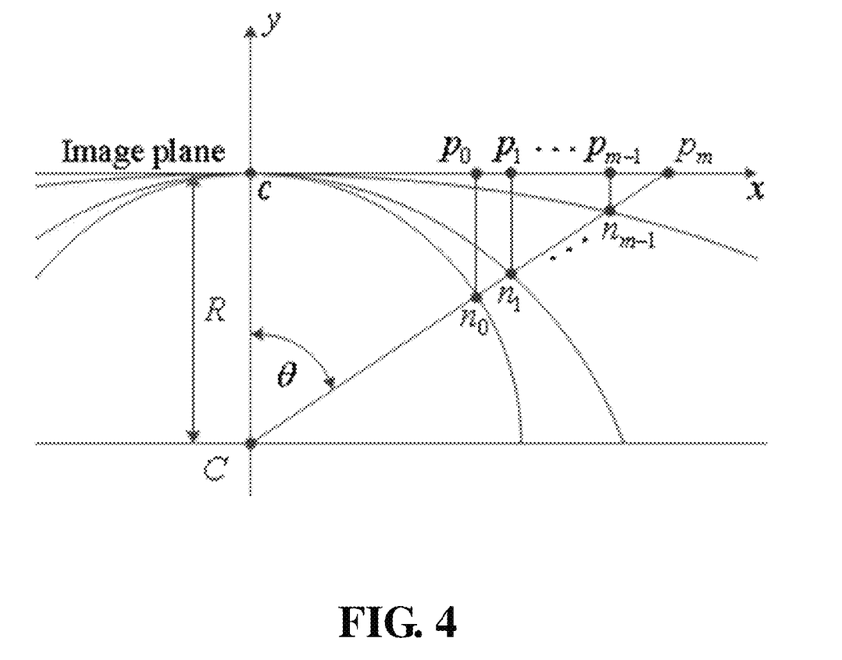
FIG. 4 is a flowchart of a phased non-dyadic lens correcting model according to an exemplary embodiment of the present invention.
Figure 5:
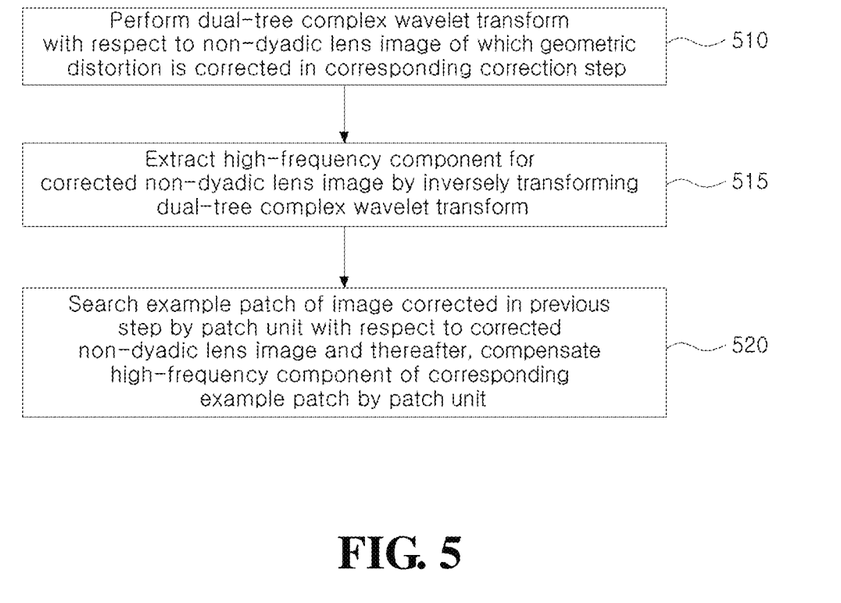
FIG. 5 is a flowchart illustrating a method for compensating a high-frequency component in a non-dyadic lens image corrected by the patch unit according to an exemplary embodiment of the present invention.
Figure 6:
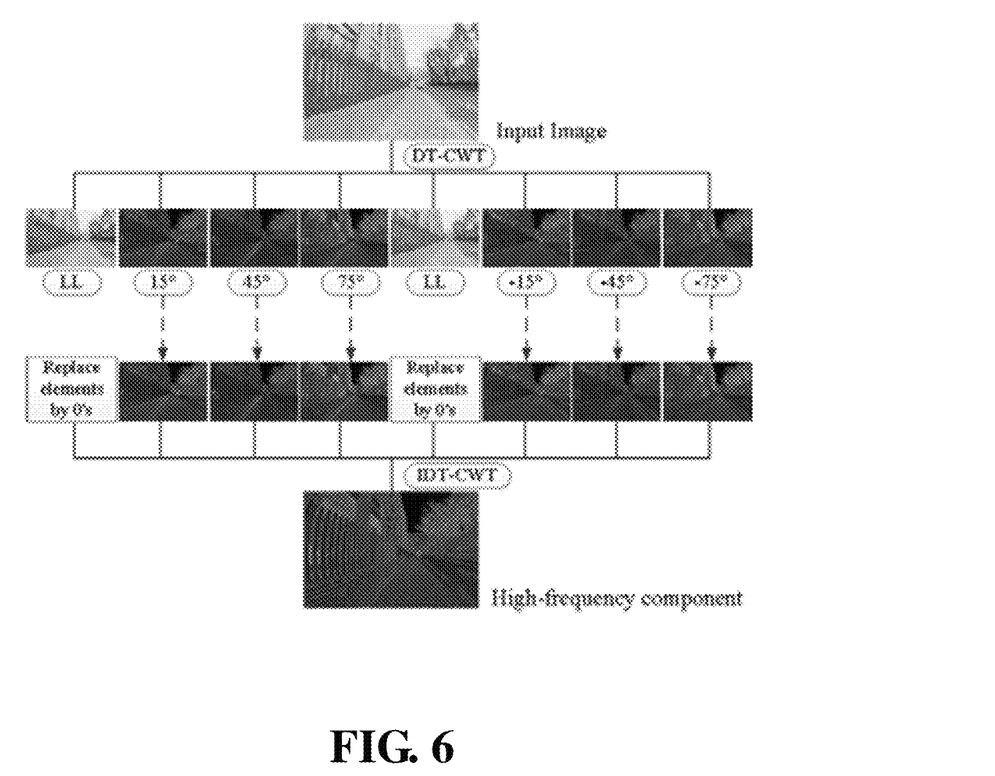
FIG. 6 is a diagram illustrated for describing dual tree complex wavelet conversion according to an exemplary embodiment of the present invention.
Figure 7:
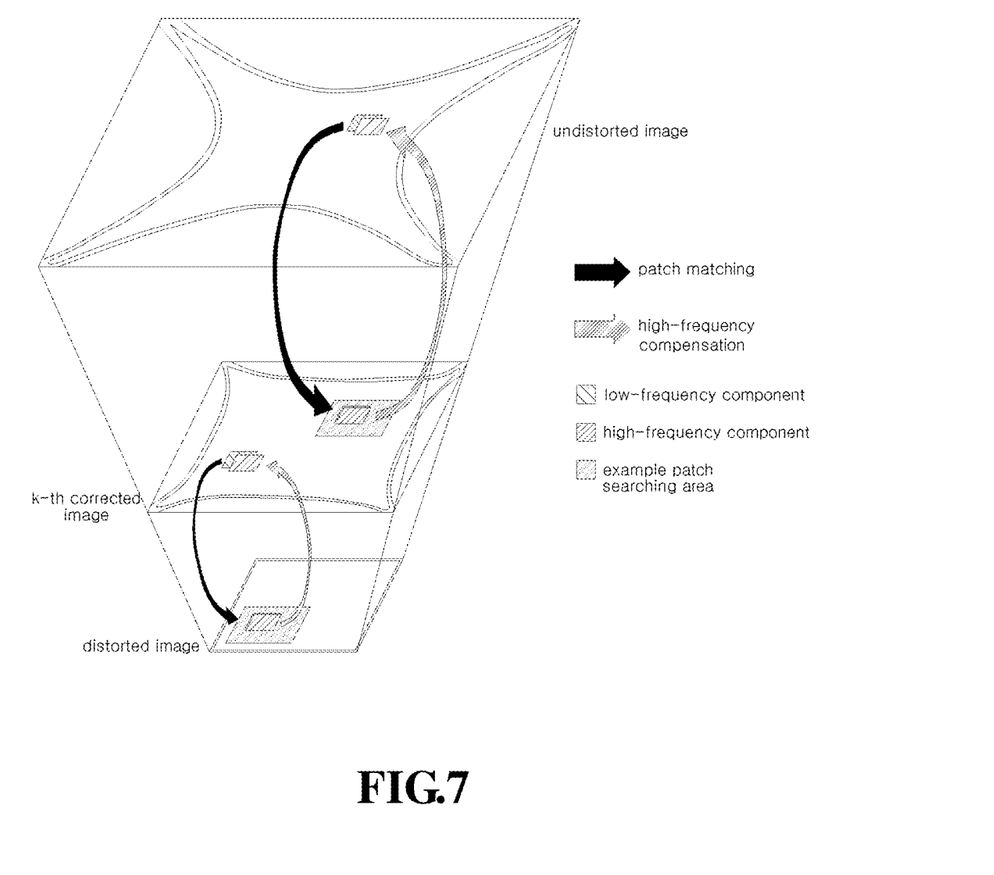
FIG. 7 is a diagram illustrated for describing a patch search concept according to an exemplary embodiment of the present invention.

FIG. 1 is a flowchart of a non-dyadic lens distortion correction method according to an exemplary embodiment of the present invention, FIGS. 2A and 2B are diagrams illustrating a non-dyadic lens image distortion correcting result based on a projection image, FIG. 3 is a flowchart of a phased non-dyadic lens distortion correction method according to an exemplary embodiment of the present invention, FIG. 4 is a flowchart of a phased non-dyadic lens correcting model according to an exemplary embodiment of the present invention, FIG. 5 is a flowchart illustrating a method for compensating a high-frequency component in a non-dyadic lens image corrected by the patch unit according to an exemplary embodiment of the present invention, FIG. 6 is a diagram illustrated for describing dual tree complex wavelet conversion according to an exemplary embodiment of the present invention, and FIG. 7 is a diagram illustrated for describing a patch search concept according to an exemplary embodiment of the present invention.

In step 110, a non-dyadic lens distortion correction apparatus 100 acquires a non-dyadic lens image.

The non-dyadic lens distortion correction apparatus 100 may acquire the non-dyadic lens image through an image acquiring apparatus with a non-dyadic lens and the non-dyadic lens distortion correction apparatus 100 includes the image acquiring apparatus with the non-dyadic lens to acquire the non-dyadic lens image.

In step 115, the non-dyadic lens distortion correction apparatus 100 applies a magnification ratio based on a projection model to correct geometric distortion for the non-dyadic lens image by stage.

Geometric radial distortion occurs in an image photographed by using the non-dyadic lens. When the geometric distortion is corrected by using a bicubic interpolation method or a bilinear interpolation method, a blurring phenomenon and a step phenomenon occur as illustrated in FIG. 2B.

A designated magnification ratio is applied based on the projection model of the present invention to magnify and correct the non-dyadic lens image by stage. This will be described in more detail with reference to FIG. 3.

In step 310, the non-dyadic lens distortion correction apparatus 100 calculates a phased compensation point $p_i$ depending on the magnification ratio by multiplying a distortion function by the magnification ratio in the projection model.

Herein, the phased compensation point $p_i$ may be defined as shown in Equation 1 given below.

$$p_i = (R \sin(\theta) \times s^i, 0), s=n \qquad \text{[Equation 1]}$$

Herein, R represents a distance up to an image plane from a principal point C and s represents the magnification ratio. Herein, the magnification ratio s is determined as n and n is an integer number. For example, the magnification ratio s may be determined as 1.25 or less. Further, θ represents an angle between a point P (that is, a point on the image plane) in a 3D space and an optical axis.

In the exemplary embodiment of the present invention, it is assumed that the magnification ratio is determined as 1.25 or less in order to select a patch having high similarity when correcting the non-dyadic lens image, but it is natural that the magnification ratio may be determined as a value larger than 1.25.

That is, the phased compensation point $p_i$ in each correction step may be calculated by multiplying the distance up to the point P on the distorted image plane on the optical axis y by the magnification ratio.

When calculation of the phased compensation point $p_i$ is completed, in step 315, the non-dyadic lens distortion correction apparatus 100 calculates a corresponding point $n_i$ corresponding to a linear phased compensation point $p_i$ connecting the principal point and the point (that is, the point P on the image plane) in the 3D space based on the projection model by using the phased compensation point $p_i$.

The corresponding point $n_i$ corresponding to a linear phased compensation point $p_i$ may be calculated by using Equation 2 given below.

$$n_i = \left(R\sin(\theta) \times s^i, \frac{\cos(\theta)}{\sin(\theta)}(R\sin(\theta) \times s^i) - R\right) \qquad \text{[Equation 2]}$$

Referring to FIG. 4, a relationship with the corresponding point $n_i$ corresponding to the phased compensation point $p_i$ is definitely illustrated. The relationship between the phased compensation point $p_i$ and the corresponding point will be more definitely appreciated by FIG. 4.

As described above, when the corresponding point $n_i$ on a straight line, which links the principal point C and a point $p_m$ is acquired, in step 320, the non-dyadic lens distortion correction apparatus 100 calculates a focus $F_i$ of a parabolic equation, which passes through the optical axis on the image plane and the corresponding point $n_i$.

The focus $F_i$ of the parabolic equation, which passes through the corresponding point $n_i$ is defined as shown in Equation 3.

$$F_i = \frac{(R\sin(\theta) \times s^i)^2}{4\left(\frac{\cos(\theta)}{\sin(\theta)}(R\sin(\theta) \times s^i) - R\right)} \qquad \text{[Equation 3]}$$

In step 325, the non-dyadic lens distortion correction apparatus 100 corrects the geometric distortion of the non-dyadic lens image depending on the magnification ratio by using the focus $F_i$.

As described above, the non-dyadic lens distortion correction apparatus 100 may magnify and correct the non-dyadic lens image by stage based on the parabolic equation according to the magnification ratio.

In step 120, the non-dyadic lens distortion correction apparatus 100 compensates a high-frequency component of an image corrected in the previous step in the non-dyadic lens image of which the geometric distortion is corrected.

This will be described in more detail with reference to FIG. 5.

In step 510, the non-dyadic lens distortion correction apparatus 100 performs of dual-tree complex wavelet transform (CWT) with respect to the non-dyadic lens image of which the geometric distortion is corrected.

In step 515, the non-dyadic lens distortion correction apparatus 100 extracts the high-frequency component for the non-dyadic lens image corrected by inversely transforming the dual-tree complex wavelet transform.

In more detail, the non-dyadic lens distortion correction apparatus 100 may extract a high-frequency component in various directions for the corresponding non-dyadic lens image by performing inverse transform after making a low-frequency subband (LL) to 0 in a result of the dual-tree complex wavelet transform.

Referring to FIG. 6, since general discrete wavelet transform dissolves an image into a low-frequency band and high-frequency components in horizontal, vertical, and diagonal directions, when various slant-direction edges are expressed, a discontinuity or discontinuation phenomenon occurs. However, since DT-CWT dissolves an input image into two low-frequency subbands and high-frequency subbands having 6 directions (15, −15, 45, −45, 75, and −75), the DT-CWT may express an edge in a minute direction as compared with the discrete wavelet transform.

The non-dyadic lens distortion correction apparatus 100 may extract high-frequency components in various directions by performing inverse transform after making two low-frequency subbands among 8 divided subbands to 0 by using the DT-CWT.

Since the high-frequency component is extracted in the previous step with respect to the image corrected in the previous step, a process of extracting the high-frequency component will be not separately described.

In step 520, the non-dyadic lens distortion correction apparatus 100 searches an example patch of the image corrected in the previous step by the patch unit with respect to the non-dyadic lens image and thereafter, compensates a high-frequency component of the corresponding example patch by the patch unit (see FIG. 7).

To this end, the non-dyadic lens distortion correction apparatus 100 defines each of a patch in which a center coordinate of the non-dyadic lens corrected in a current step is $(x_D, y_D)$ and an example patch around a coordinate $(x'_D, y'_D)$ corresponding to the image corrected in the previous step as shown in Equation 4 given below.

$$\hat{g}_{P(x_D,y_D)}^k(a,b) = \hat{g}^k(x_D+a, y_D+b)$$

$$\hat{g}_{P(x'_D+i,y'_D+j)}^{k-1}(a,b) = \hat{g}^{k-1}(x'_D+a+i, y'_D+b+j) \qquad \text{[Equation 4]}$$

Herein, $$-\frac{B}{2} \le a, b \le \frac{B}{2}$$

is satisfied, B represents the size of the patch, (i,j) represents a movement vector, and P represents the patch.

In this case, an optimal movement vector $(i_O, j_O)$ is determined by a patch having a minimum value of the sum of absolute differences (SAD) and expressed as an equation as shown in Equation 5.

$$(i_o, j_o) = \qquad \text{[Equation 5]}$$

$$\operatorname{argmin}_{(i,j)} \sum_a \sum_b |\hat{g}_{LP(x_D,y_D)}^k(a,b) - \hat{g}_{LP(x'_D+i,y'_D+j)}^{k-1}(a,b)|$$

Herein, $\hat{g}_{LP}^k$ and $\hat{g}_{LP}^{k-1}$ as low-frequency components of $\hat{g}_P^k$ and $\hat{g}_P^{k-1}$ represent a patch of a lo-frequency (LL) subband in a result of the dual-tree complex wavelet transform. Therefore, the non-dyadic lens distortion correction apparatus 100 may determine an example patch most similar to the low-frequency subband image in the result of the dual-tree complex wavelet transform and thereafter, determine a final example patch in the image corrected in the previous step.

As described above, the example patch of the image corrected in the previous, which is most similar to the patch of the non-dyadic lens image corrected in the current correction step and thereafter, the high-frequency component of the corresponding example patch is compensated with the patch of the corrected non-dyadic lens image to acquire a finally enhanced non-dyadic lens image.

$$\hat{f}(x_D+a, y_D+b) = \qquad \text{[Equation 6]}$$

-continued $$\hat{g}^k(x_D+a, y_D+b) + \hat{g}_{HP(x'_D+i_O,y'_D+j_O)}^{k-1} \times \frac{1}{B^2}$$

Herein, $\hat{g}_{HP(x'_D+i_O,y'_D+j_O)}^{k-1}$ represents a high-frequency component of $\hat{g}_{P(x'_D+i_O,y'_D+j_O)}^{k-1}$ and $$\frac{1}{B^2}$$

represents a term for normalizing overlapped patches.

As described by using FIG. 5, the non-dyadic lens distortion correction apparatus 100 compensates the high-frequency component of the image corrected in the previous step by the patch unit in the non-dyadic lens image of which the geometric distortion is corrected to generate a finally enhanced image. Such a process is repeatedly performed to output a finally corrected non-dyadic lens image.

Referring back to FIG. 1, in step 125, the non-dyadic lens distortion correction apparatus 100 determines whether the number of correction steps is more than the number of final correction steps.

If the number of correction steps is more than the number of final correction steps, the non-dyadic lens distortion correction apparatus 100 may output the finally corrected non-dyadic lens image.

However, if the number of correction steps is less than the number of final correction steps, the non-dyadic lens distortion correction apparatus 100 increases the number of correction steps in step 130 and thereafter, proceeds to step 115.

Figure 8:
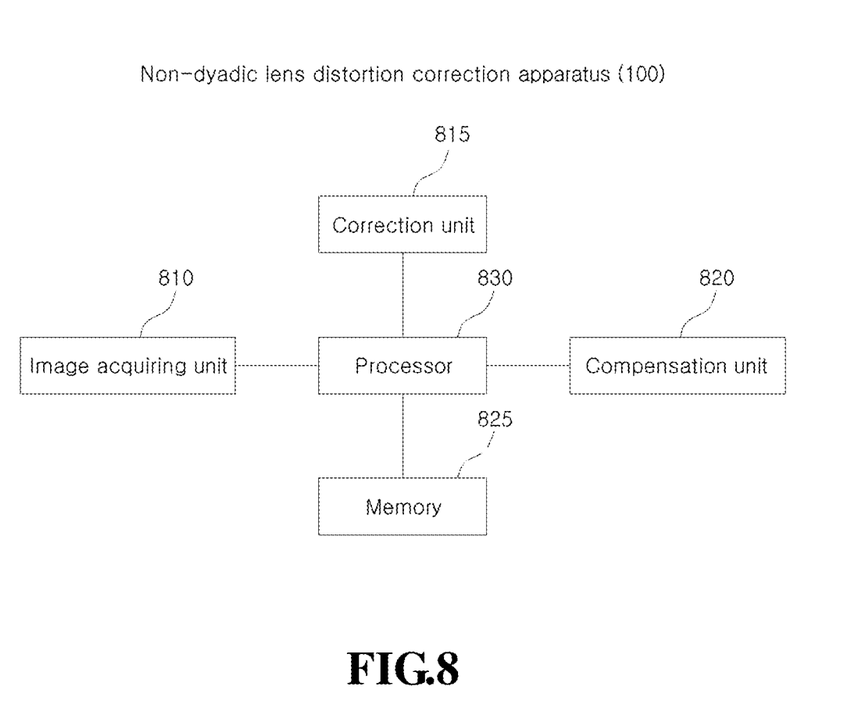
FIG. 8 is a block diagram schematically illustrating an internal configuration of a non-dyadic lens distortion correction apparatus according to an exemplary embodiment of the present invention.

FIG. 8 is a block diagram schematically illustrating an internal configuration of a non-dyadic lens distortion correction apparatus according to an exemplary embodiment of the present invention.

Referring to FIG. 8, the non-dyadic lens distortion correction apparatus 100 according to the exemplary embodiment of the present invention is configured to include an image acquiring unit 810, a correction unit 815, a compensation unit 820, a memory 825, and a processor 830.

The image acquiring unit 810 performs a function to acquire a non-dyadic lens image photographed through a non-dyadic lens.

The correction unit 815 performs a function to correct geometric distortion for the non-dyadic lens image by applying a magnification ratio based on a projection model. Since this is described with reference to FIG. 3, a duplicated description will be omitted.

The compensation unit 820 performs a function to compensate a high-frequency component of an image corrected in a previous step by the patch unit in the non-dyadic lens image of which the geometric distortion is corrected. Since this is described with reference to FIG. 5, a duplicated description will be omitted.

Further, the correction unit 815 and the compensation unit 820 may operate repeatedly multiple times according to control of the processor 830. That is, the correction unit 815 and the compensation unit 820 may operate repeatedly multiple times until the number of correction steps is equal to or more than the number of final correction steps according to control of the processor 830. The process 830 may increase the number of correction steps by a designated size (for example, 1) whenever the correction unit 815 and the compensation unit 820 perform one correction step.

The memory 825 serves to store various algorithms used during correcting the non-dyadic lens by stage according to the exemplary embodiment of the present invention and various data derived during the corresponding process.

The processor 830 serves to control internal components (for example, the image acquiring unit 810, the correction unit 815, the compensation unit 820, the memory 825, and like) of the non-dyadic lens distortion correction apparatus 100 according to the exemplary embodiment of the present invention.

FIGS. 9A to 9D are diagrams illustrating non-dyadic lens image correcting results in the related art and according to an exemplary embodiment of the present invention.

Figure 9A:
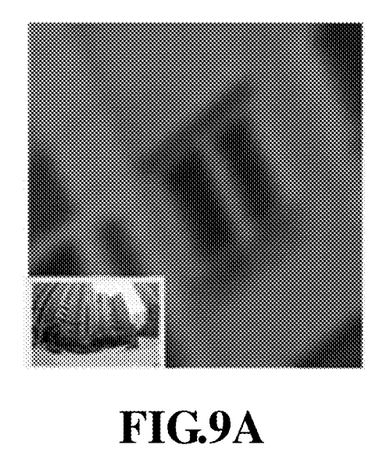
FIGS. 9A to 9D are diagrams illustrating non-dyadic lens image correcting results in the related art and according to an exemplary embodiment of the present invention.
Figure 9B:
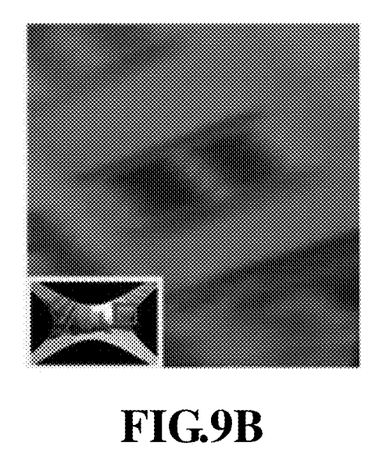
Figure 9C:
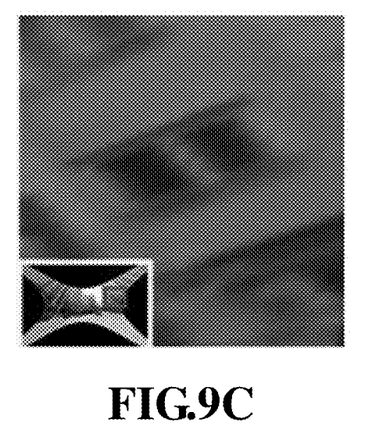
Figure 9D:
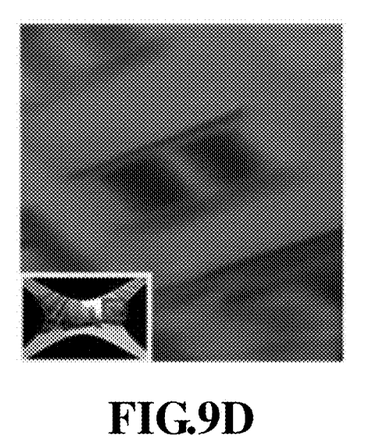

FIG. 9A illustrates an original image, FIG. 9B illustrates an image correcting result based on a projection model in the related art, FIG. 9C illustrates a result acquired by applying a patch referring method to FIG. 8B, and FIG. 9D illustrates a non-dyadic lens image correcting result according to an exemplary embodiment of the present invention.

As illustrated in FIG. 9, in a result acquired by correcting the non-dyadic lens image by applying an autonomous example patch through application of a phased non-dyadic lens correcting method, it can be seen that step and blurring phenomena which occur during the non-dyadic lens correcting process may be effectively removed.

Meanwhile, the non-dyadic lens distortion correction method according to the exemplary embodiment of the present invention is implemented in a program command form which may be performed through various means for processing information to be recorded in a storage medium. The storage medium may include singly or combinationally a program command, a data file, a data structure, and the like.

The program command recorded in the storage medium may be specially designed and configured for the present invention, or may be publicly known to and used by those skilled in a software field. Examples of the storage medium include magnetic media such as a hard disk, a floppy disk, and a magnetic tape, optical media such as a CD-ROM and a DVD, a magneto-optical media such as a floptical disk, and a hardware device which is specifically configured to store and examples of the program command such as a ROM, a RAM, and a flash memory. An example of the program command includes a high-level language code executable by a device electrically processing information, for example, a computer by using an interpreter, and the like, as well as a machine language code created by a compiler.

The hardware device may be configured to be operated with one or more software modules in order to perform the operation of the present invention, and an opposite situation thereof is available.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A non-dyadic lens distortion correction method comprising:

(a) acquiring a non-dyadic lens image photographed through a non-dyadic lens;

(b) correcting geometric distortion for the non-dyadic lens image by stage by applying a magnification ratio based on a projection model; and (c) compensating a high-frequency component of an image corrected in a previous step by the patch unit in the non-dyadic lens image of which the geometric distortion is corrected, wherein step (b) includes:
calculating a phased compensation point $p_i$ depending on the magnification ratio by multiplying a distortion function in the projection model by the magnification ratio, calculating a corresponding point $n_i$ corresponding to the phased compensation point $p_i$ on a straight line connecting a principal point and a point P in a 3D space based on the projection model, calculating a focus $F_i$ of a parabolic equation passing through an optical axis on an image plane and the corresponding point $n_i$, and correcting the geometric distortion of the non-dyadic lens image depending on the magnification ratio by using the focus $F_i$.

2. The non-dyadic lens distortion correction method of claim 1, wherein steps (b) and (c) are performed by stage according to the magnification ratio until the number of correction steps is more than the number of final correction steps.

3. The non-dyadic lens distortion correction method of claim 1, wherein:

the focus $F_i$ is calculated by an equation given below:

$$F_i = \frac{(R\sin(\theta) \times s^i)}{4\left(\frac{\cos(\theta)}{\sin(\theta)}(R\sin(\theta) \times s^i) - R\right)},$$

whereby R represents a distance between the principal point and the image plane, s represents the magnification ratio, i represents the correction step, and θ represents an angle between the optical axis and the point P in the 3D space.

4. The non-dyadic lens distortion correction method of claim 1, wherein:

step (c) includes performing dual-tree complex wavelet transform with respect to each of the corrected non-dyadic lens image and the image corrected in the previous step;

transforming a low-frequency subband into a first value in a result of the wavelet transform and thereafter, extracting the high-frequency component by performing inverse transform;

searching an example patch of the image corrected in the previous step, which is most similar to a patch of the corrected non-dyadic lens image; and compensating a high-frequency component of the searched example patch with the patch of the corrected non-dyadic lens image.

5. The non-dyadic lens distortion correction method of claim 4, wherein in the searching of the example patch of the image corrected in the previous step, which is most similar to the patch of the corrected non-dyadic lens image, the example patch is searched by using the low-frequency subband of the wavelet transform result.

6. The non-dyadic lens distortion correction method of claim 4, wherein:

the searching of the example patch of the image corrected in the previous step, which is most similar to the patch of the corrected non-dyadic lens image includes calculating an optimal movement vector with a minimum value of the sum of absolute differences between the patch of the corrected non-dyadic lens image and the example patch of the image corrected in the previous; and selecting a final example patch by reflecting the movement vector to the example patch.

7. A non-transitory recorded medium product having recorded thereon and tangibly embodying a program code for performing the method according to claim 1.

8. A non-dyadic lens distortion correction apparatus including a memory storing program instructions and a processor executing the stored program instructions to control operation of the non-dyadic lens distortion correction apparatus, the non-dyadic lens distortion correction apparatus comprising:

an image acquiring unit operatively coupled to the processor acquiring a non-dyadic lens image photographed through a non-dyadic lens;

a correction unit operatively coupled to the processor correcting geometric distortion for the non-dyadic lens image by stage by applying a magnification ratio based on a projection model; and a compensation unit operatively coupled to the processor compensating a high-frequency component of an image corrected in a previous step by the patch unit in the non-dyadic lens image of which the geometric distortion is corrected, wherein the correction unit calculates a phased compensation point $p_i$ depending on the magnification ratio by multiplying a distortion function in a projection model by the magnification ratio, calculates a corresponding point $n_i$ corresponding to the phased compensation point pi on a straight line connecting a principal point and a point P in a 3D space based on the projection model, calculates a focus $F_i$ of a parabolic equation passing through an optical axis on an image plane and the corresponding point $n_i$, and corrects the geometric distortion of the non-dyadic lens image depending on the magnification ratio by using the focus $F_i$.

9. The non-dyadic lens distortion correction apparatus of claim 8, wherein the correction unit and the compensation unit repeatedly perform the correction and compensation processes until the number of correction steps is more than the number of final correction steps.

10. The non-dyadic lens distortion correction apparatus of claim 8, wherein the compensation unit performs dual-tree complex wavelet transform with respect to each of the corrected non-dyadic lens image and the image corrected in the previous step, transforms a low-frequency subband into a first value in a result of the wavelet transform and thereafter, extracts each high-frequency component by performing inverse transform, and searches an example patch of the image corrected in the previous step, which is most similar to the patch of the corrected non-dyadic lens image with the patch of the corrected non-dyadic lens image.

11. The non-dyadic lens distortion correction apparatus of claim 10, wherein the compensation unit searches the similar example patch by using the low-frequency subband among the wavelet transform results for the corrected non-dyadic lens image and the image corrected in the previous step.

12. The non-dyadic lens distortion correction apparatus of claim 10, wherein the compensation unit calculates an optimal movement vector with a minimum value of the sum of absolute differences between the patch of the corrected non-dyadic lens image and the example patch of the image corrected in the previous; and selects a final example patch most similar to the patch of the corrected non-dyadic lens image by reflecting the movement vector to the example patch.

\* \* \* \* \*